US008432584B2

(12) United States Patent
Cui

(10) Patent No.: US 8,432,584 B2
(45) Date of Patent: Apr. 30, 2013

(54) SCANNER AND SYSTEM EMPLOYING COMPOSITE ILLUMINATION

(75) Inventor: Chengwu Cui, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1322 days.

(21) Appl. No.: 11/964,082

(22) Filed: Dec. 26, 2007

(65) Prior Publication Data

US 2009/0168122 A1 Jul. 2, 2009

(51) Int. Cl.
*H04N 1/04* (2006.01)

(52) U.S. Cl.
USPC .................... 358/475; 358/484; 358/497

(58) Field of Classification Search .................. 358/1.3, 358/1.6, 505–516, 475, 474, 482–485
See application file for complete search history.

(56) References Cited

U.S. PATENT DOCUMENTS

| | | | | |
|---|---|---|---|---|
| 4,926,253 A | * | 5/1990 | Nakashima et al. | 358/515 |
| 4,996,606 A | * | 2/1991 | Kawai et al. | 358/475 |
| 5,712,674 A | * | 1/1998 | Doi | 347/238 |
| 5,751,447 A | * | 5/1998 | Brook et al. | 358/487 |
| 6,096,272 A | * | 8/2000 | Clark et al. | 422/64 |
| 6,104,510 A | * | 8/2000 | Hu et al. | 358/509 |
| 6,133,580 A | * | 10/2000 | Sun | 250/566 |
| 6,195,183 B1 | * | 2/2001 | Fujimoto et al. | 358/514 |
| 6,437,358 B1 | * | 8/2002 | Potucek et al. | 250/559.45 |
| 6,486,978 B1 | * | 11/2002 | Tsai | 358/475 |
| 6,532,085 B2 | * | 3/2003 | Fujinawa | 358/475 |
| 6,646,769 B1 | * | 11/2003 | Fang | 358/509 |
| 7,088,477 B2 | * | 8/2006 | Koshimizu et al. | 358/487 |
| 7,196,849 B2 | * | 3/2007 | McGuire et al. | 359/630 |
| 7,233,419 B2 | * | 6/2007 | Chang | 358/475 |
| 7,385,169 B2 | * | 6/2008 | Saitou et al. | 250/208.1 |
| 7,625,098 B2 | * | 12/2009 | Rains et al. | 362/231 |
| 7,630,105 B2 | * | 12/2009 | Sheng et al. | 358/497 |
| 7,656,520 B2 | * | 2/2010 | Cohn et al. | 356/237.2 |
| 7,697,762 B2 | * | 4/2010 | Tatsuno | 382/190 |
| 7,737,937 B2 | * | 6/2010 | Fisekovic et al. | 345/102 |
| 7,791,771 B2 | * | 9/2010 | Shiraishi | 358/475 |
| 2002/0168116 A1 | * | 11/2002 | Takayama et al. | 382/275 |
| 2005/0128551 A1 | * | 6/2005 | Yang | 359/214 |
| 2006/0209365 A1 | * | 9/2006 | Lee et al. | 358/486 |
| 2008/0297860 A1 | * | 12/2008 | Huang | 358/505 |

* cited by examiner

*Primary Examiner* — Twyler Haskins
*Assistant Examiner* — Jonathan Beckley
(74) *Attorney, Agent, or Firm* — John Victor Pezdek

(57) ABSTRACT

A scan module including an image sensor defining a scan field, at least one lamp positioned to illuminate at least a portion of the scan field, and a second light source positioned to provide illumination for the portion of the scan field.

18 Claims, 6 Drawing Sheets

SCANNER AND SYSTEM EMPLOYING COMPOSITE ILLUMINATION

TECHNICAL FIELD

The present application is generally directed to scanners (e.g., document scanners) and, more particularly, to scanners and associated systems employing composite illumination.

BACKGROUND

Scanners typically are used to scan a document to create a scanned image and associated image data. The scanned image may be printed, faxed, displayed on a computer monitor, used by a computer program or the like.

Scanner speed performance can be limited by the amount of light required to illuminate the document. In particular, as the scanner speed increases, the light exposure time decreases proportionally. Therefore, a faster scanner typically requires increased illumination intensity across the entire document to be scanned.

Due to the inherent optical properties of typical scanner lenses, prior art scanners attenuate more light at the edges of the scanning field than at the center of the scanning field, thereby creating the known vignette effect, wherein the edges of the scanning field only receive about 40 to about 60 percent of the light received in the center of the scanning field. A graphical illustration of illumination intensity versus field angle in a prior art scanner subject to the vignette effect is shown in FIG. 1.

One prior art solution to address the vignette effect is to attenuate the center of the scanning field by about 20 to 40 percent. The center attenuation is achieved using an absorption band on the lamp reflector(s) and/or a shading plate near the lens. A graphical illustration of illumination intensity versus field angle using center attenuation is shown in FIG. 2. While a somewhat flatter illumination profile is achieved, the center attenuation design approach may waste light and, therefore, may be inefficient.

Accordingly, there is a need for a scanner and associated system for achieving more uniform illumination intensity versus field angle without the potential inefficiencies associated with center attenuation.

SUMMARY

In one aspect, a scan module may include an image sensor defining a scan field, at least one lamp positioned to illuminate at least a portion of the scan field, and a second light source positioned to provide additional illumination for the portion of the scan field.

In another aspect, a scan module for scanning a document may include a housing, an image sensor mounting in the housing, the image sensor defining an elongated scan field, an elongated lamp mounted in the housing, the elongated lamp being generally aligned with the elongated scan field to illuminate at least a portion of the elongated scan field, and a second light source mounted in the housing, the second light source being positioned to provide additional illumination for the portion of the elongated scan field, wherein light from the elongated lamp and the second light source is reflected from the document, passed through an optical slit and detected by the image sensor.

In another aspect, a multi-function peripheral device may include a processor and a scanner component in communication with the processor, the scanner component including a scan module including an image sensor defining a scan field, an elongated lamp generally aligned with the scan field to illuminate the scan field, and a second light source positioned to illuminate a select portion of the scan field.

Other aspects of the disclosed scanner and system employing composite illumination will become apparent from the following description, the accompanying drawings and the appended claims.

DETAILED DESCRIPTION

Figure 1:
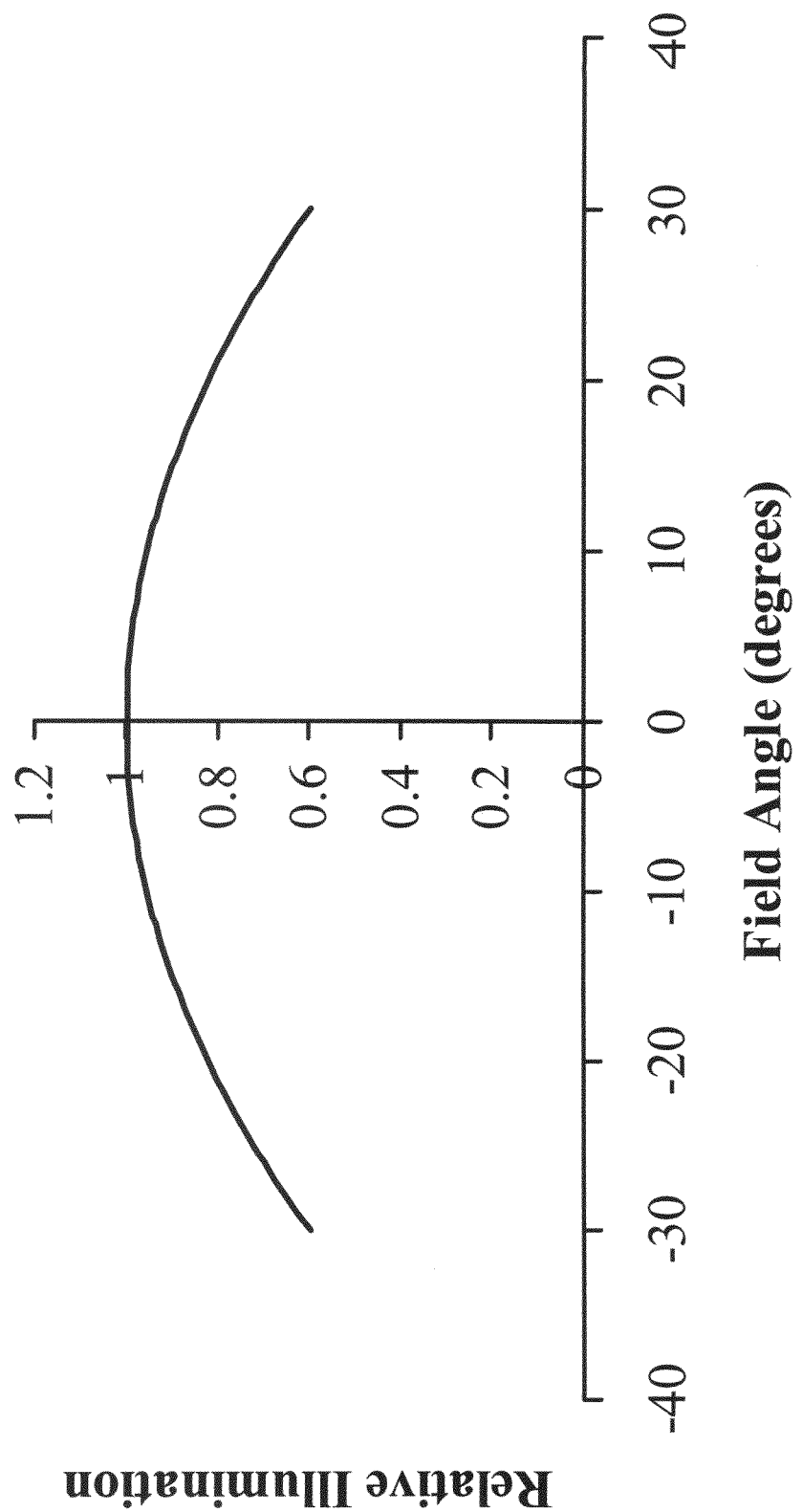
FIG. 1 is a graphical illustration of relative illumination intensity versus field angle on an image sensor of a scan module in an unmodified (prior art) configuration.
Figure 2:
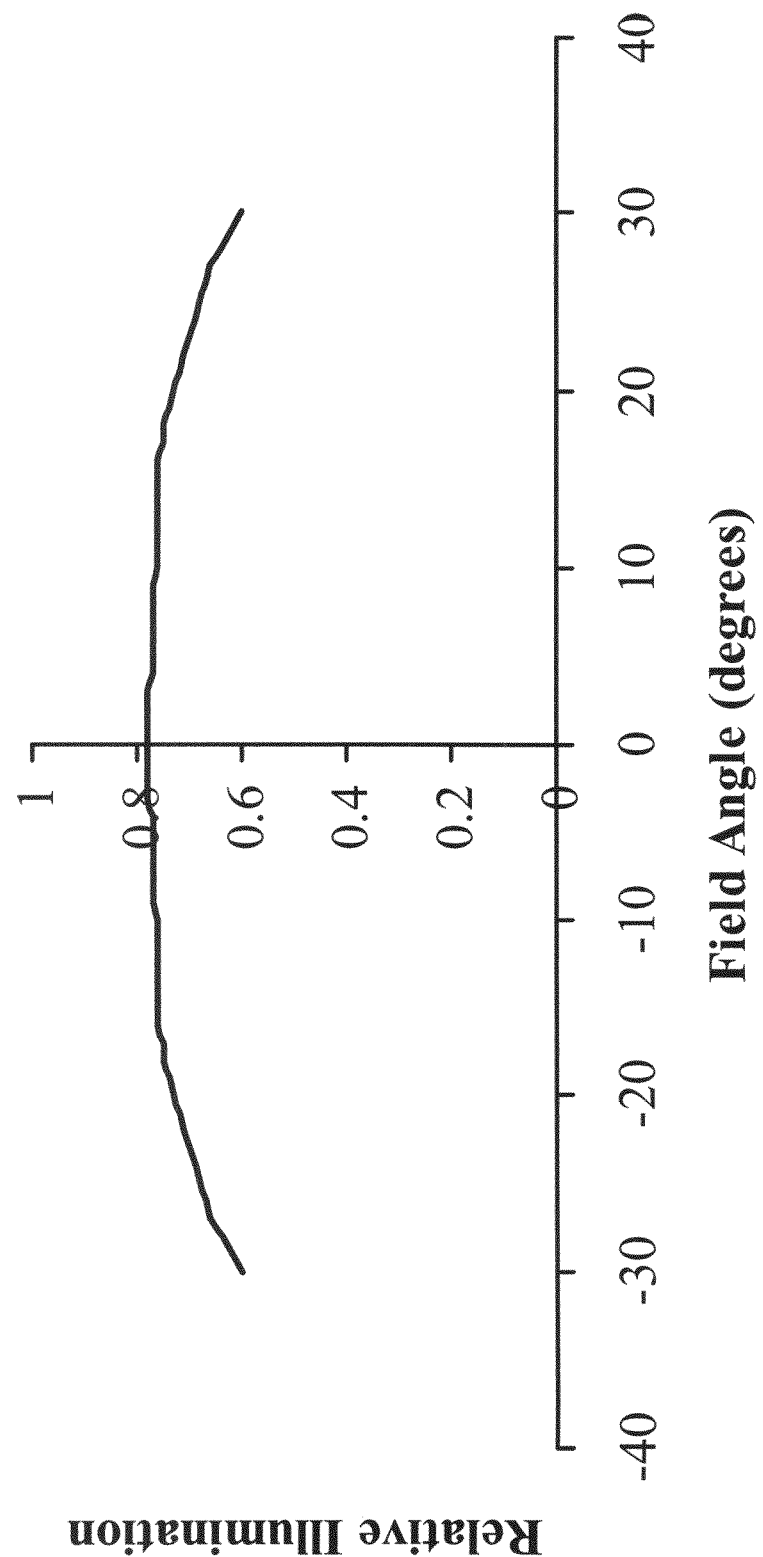
FIG. 2 is a graphical illustration of relative illumination intensity versus field angle on an image sensor of a scan module in a center-attenuated (prior art) configuration.
Figure 3:
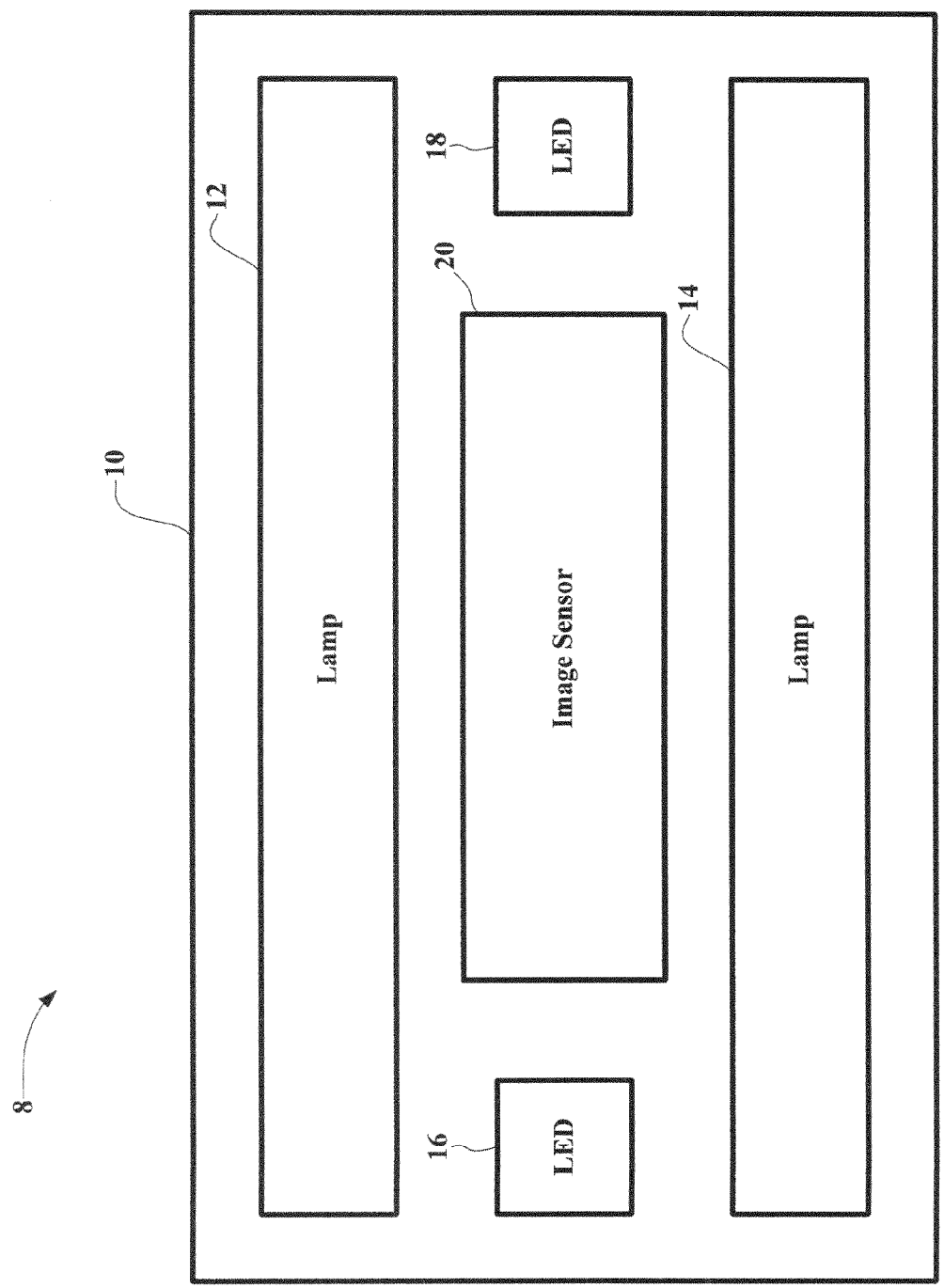
FIG. 3 is a block diagram of a scan module according to an aspect of the disclosed scanner and system employing composite illumination.

As shown in FIG. 3, a scan module 8, such as a scan bar, according to one aspect of the present disclosure may include a housing 10, lamps 12, 14, light emitting diodes ("LEDs") 16, 18 and an image sensor 20.

Figure 4:
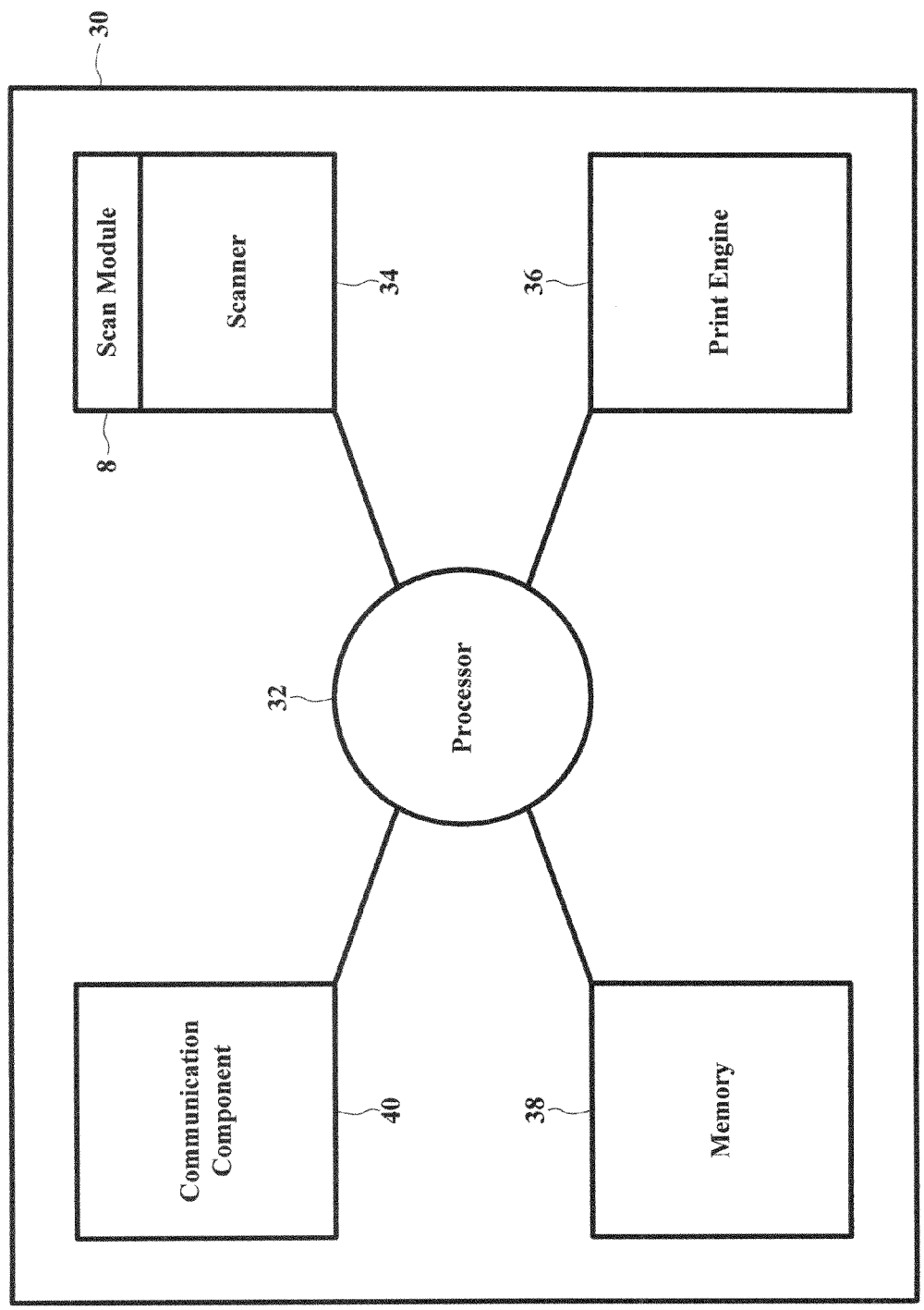
FIG. 4 is a block diagram of a multi-function peripheral device including a scanner component incorporating the scan module of FIG. 3.

As shown in FIG. 4, the scan module 8 may be associated with a scanner component 34 of a device 30. For example, the device 30 may be a multi-function peripheral device or the like and may optionally include, in addition to the scanner component 34, a processor 32, a print engine 36, a memory device 38 and a communication component 40. The processor 32 may coordinate scanning documents at the scanner 34 and, optionally, printing the scanned image data with the print engine 36, storing the scanned image data in memory 38 and/or transmitting the scanned image data with the communication component 40.

Referring back to FIG. 3, the lamps 12, 14 may be cold cathode fluorescent lamps, xenon fluorescent lamps or the like. The LEDs 16, 18 may be any appropriate light emitting diodes, such as white light emitting diodes. In alternate embodiments, the LEDs 16, 18 may also be red, green, blue or other colors provided that the LEDs 16, 18 used create an illumination effect which matches that of the lamps 12, 14. In one aspect, the spectral content of the LEDs 16, 18 may be generally matched with the spectral content of the lamps 12, 14. For example, the LEDs 16, 18 may be white phosphor LEDs, and the lamps 12, 14 may be cold cathode fluorescent lamps incorporating white phosphor similar to the white phosphor used in the LEDs 16, 18.

Figure 5:
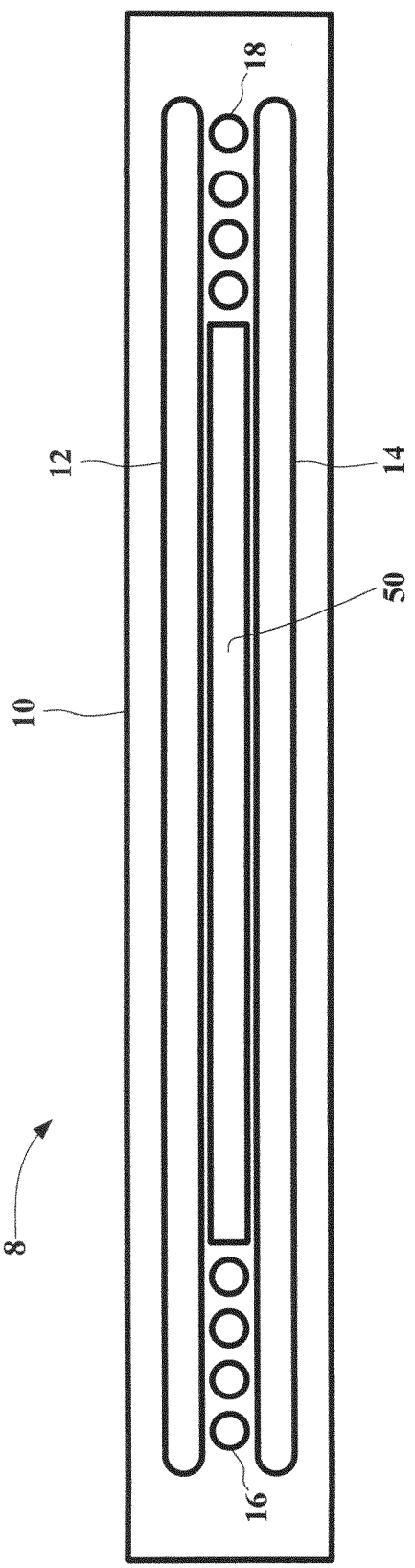
FIG. 5 is a top plan view of a scan module according to an aspect of the disclosed scanner and system employing composite illumination.

While FIGS. 3 and 5 illustrate a scan module 8 with two lamps 12, 14, those skilled in the art will appreciate that scan modules within the scope of the present disclosure may be prepared with a single lamp or with more than two lamps. Furthermore, while FIG. 3 illustrates a scan module 8 with only two LEDs 16, 18 (eight LEDs 16, 18 are shown in FIG. 5), those skilled in the art will appreciate that scan modules within the scope of the present disclosure may incorporate various numbers and combinations of LEDs, with the LEDs positioned in various locations, depending upon the operation of the lamps 12, 14 and the desired illumination versus field angle profile.

The image sensor 20 may be any appropriate optical or image sensor useful in scanning operations. For example, the image sensor 20 may include the necessary optical components, such as folding mirrors, a lens, and a charge-coupled device (CCD) or an array of charge-coupled devices.

Figure 6:
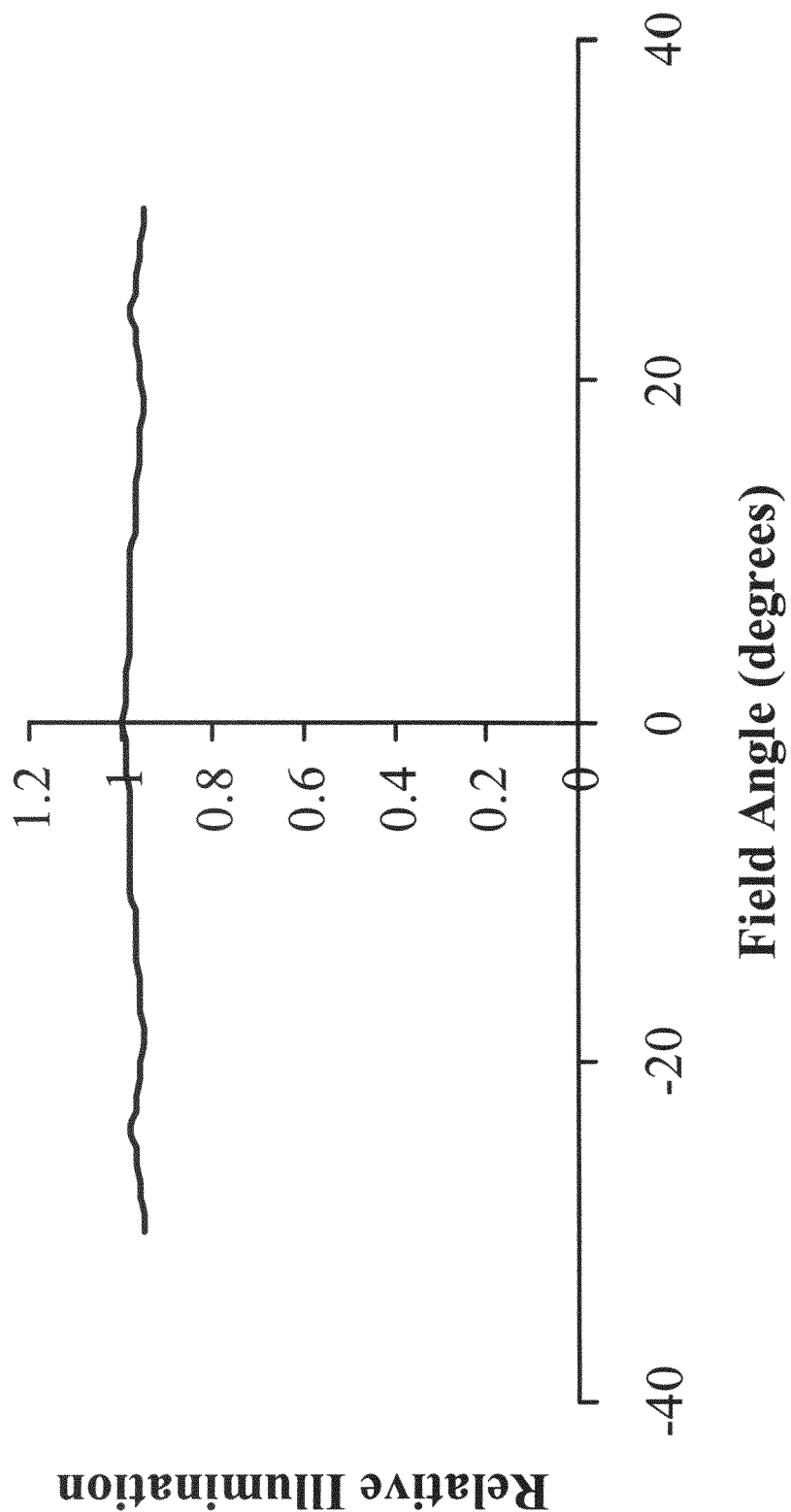
FIG. 6 is a graphical illustration of relative illumination intensity versus field angle obtainable with the scan module of FIG. 5.

The image sensor 20 may define a scan field from which the image sensor 20 may receive image data. In particular, the image sensor 20 may detect light intensity reflected from a document positioned in the scan field. The scan field may be generally aligned with the lamps 12, 14 and may be elongated and may extend away from the center of the image sensor 20. For example, as shown in FIG. 6, the center of the scan field may correspond with a field angle of zero (i.e., at the center of the image sensor) and may extend about 30 degrees in a first axial direction and 30 degrees in a second axial direction (i.e., −30 degrees).

As shown in FIG. 5, the lamps 12, 14 may be positioned in the scan module 8 such that they are spaced apart and generally parallel with each other with an optical slit 50 therebetween. The optical slit 50 may direct light emitted from the lamps 12, 14 and the LEDs 16, 18 and reflected off of the scanned document into the scan module 8 where it may be sensed by the image sensor 20.

The LEDs 16, 18 may be positioned in various locations in the scan module 8, depending upon the need for additional illumination. In one example, as shown in FIG. 5, the LEDs 16, 18 may be positioned between the lamps 12, 14. In a second example, as shown in FIG. 5, the LEDs 16, 18 may be positioned at or near the ends of the lamps 12, 14. In a third example, as shown in FIG. 5, the LEDs 16, 18 may be positioned between the lamps 12, 14 and adjacent to the ends of the lamps 12, 14.

Furthermore, the orientation and direction of the LEDs 16, 18 may be adjusted to optimize the illumination profile.

Still furthermore, the LEDs 16, 18 may be focused to broadly disperse light more uniformly across the scan field or to narrowly illuminate a specific portion of the scan field.

Accordingly, those skilled in the art will appreciate that the LEDs 16, 18 may be positioned in various locations within the scan module 8 such that the LEDs 16, 18 provide additional illumination to the areas of the scan field in need of additional illumination. Therefore, as shown in FIG. 6, the use of LEDs 16, 18 in combination with lamps 12, 14 may provide a more uniform illumination versus field angle profile.

While the scan module 8 is illustrated using LEDs 16, 18, it will be appreciated by one of ordinary skill in the art that other light sources of small dimension capable of compensating lighting in limited spaces may also be used in connection with scan module 8.

Additionally, those skilled in the art will appreciate that various configurations of scan modules 8 may be assembled without departing from the scope of the present invention. For example, those skilled in the art will appreciate that the teachings of the present invention may be applied to scan bars and related structures incorporating various lighting and light sensing technologies. In one specific example, the scan module 8 may include an array of charge-coupled devices, two cold cathode fluorescent lamps and a plurality of white LEDs. In another specific example, the scan module 8 may include an array of charge-coupled devices, two xenon fluorescent lamps and a plurality of white LEDs.

Although various aspects of the disclosed scanner and system employing composite illumination have been shown and described, modifications may occur to those skilled in the art upon reading the specification. The present invention includes such modifications and is limited only by the scope of the claims.

What is claimed is:

1. A scan module comprising:
   an image sensor defining a scan field;
   at least two lamps extending parallel to each other and positioned to illuminate said scan field, each of said at least two lamps having a first longitudinal end and a second longitudinal end, wherein a first portion of said scan field receives greater illumination from said at least two lamps than a second portion of said scan field due to attenuation of the illumination from said at least two lamps; and
   at least two light emitting diodes positioned between said at least two lamps and respectively adjacent said first and second longitudinal ends of said at least two lamps to provide additional illumination to said second portion of said scan field receiving less illumination from said at least two lamps than said first portion of said scan field in order to achieve a uniform illumination across said scan field.

2. The scan module of claim 1, wherein said image sensor comprises a charge-coupled device.

3. The scan module of claim 1, wherein said image sensor comprises an array of charge-coupled devices.

4. The scan module of claim 1, wherein each of said at least two lamps is at least one of a cold cathode fluorescent lamp and a xenon fluorescent lamp.

5. The scan module of claim 1, wherein said second portion of said scan field is located at opposite edges of said scan field and each of said at least two light emitting diodes is positioned at or adjacent to said opposite edges of said scan field, respectively.

6. The scan module of claim 1, wherein each of said at least two lamps is elongated across the scan field.

7. The scan module of claim 1, wherein said at least two lamps has a first spectral content and said at least two light emitting diodes have a second spectral content, said first spectral content being substantially the same as said second spectral content such that an illumination effect created by said at least two light emitting diodes matches that of said at least two lamps.

8. The scan module of claim 1, wherein said at least two lamps and said at least two light emitting diodes both include a white phosphor.

9. A scan module for scanning a document, comprising:
   a housing;
   an image sensor mounted in said housing, said image sensor defining an elongated scan field;
   a first elongated lamp and a second elongated lamp mounted in said housing, each of said first and second elongated lamps including a first longitudinal end and a second longitudinal end, said first and second elongated lamps being positioned parallel to each other and generally aligned with said elongated scan field to illuminate said elongated scan field, wherein a first portion of said elongated scan field receives greater illumination from said first and second elongated lamps than a second portion of said elongated scan field due to attenuation of the illumination from said first and second elongated lamps; and
   at least two light emitting diodes mounted in said housing, said at least two light emitting diodes being positioned between said first and second elongated lamps and respectively adjacent said first and second longitudinal ends of said first and second elongated lamps to provide additional illumination to said second portion of said elongated scan field receiving less illumination from said elongated lamp than said first portion of said elongated scan field in order to achieve a uniform illumination across said elongated scan field, wherein light from said first and second elongated lamps and said at least two light emitting diodes is reflected from said document, passed through an optical slit and detected by said image sensor.

10. The scan module of claim 9, wherein said image sensor includes at least one charge-coupled device.

11. The scan module of claim 9, wherein each of said first and second elongated lamps is at least one of a cold cathode fluorescent lamp and a xenon fluorescent lamp.

12. The scan module of claim 9, wherein said elongated scan field has a first longitudinal end portion and a second longitudinal end portion that each receive less illumination from said first and second elongated lamps than a central portion of said scan field and each of said at least two light emitting diodes is positioned at or adjacent to at least one of said first longitudinal end portion and said second longitudinal end portion.

13. The scan module of claim 9, wherein each of said first and second elongated lamps has a first spectral content and said at least two light emitting diodes has a second spectral content, said first spectral content being substantially the same as said second spectral content such that an illumination effect created by said at least one additional light source matches that of said elongated lamp.

14. The scan module of claim 9, wherein said first and second elongated lamps and said at least two light emitting diodes include a white phosphor.

15. A multi-function peripheral device, comprising:
a processor; and
a scanner component in communication with a processor, said scanner component including a scan module including an image sensor defining a scan field, a first elongated lamp and second elongated lamp positioned parallel to said first elongated lamp, said first and second elongated lamps being generally aligned with said scan field to illuminate said scan field, and at least two light emitting diodes positioned between said first and second elongated lamps and adjacent opposite ends thereof to illuminate a select portion of said scan field receiving less illumination from said first and second elongated lamps due to attenuation of the illumination from said first and second elongated lamps in order to achieve a uniform illumination across said scan field.

16. The scan module of claim 15, wherein said image sensor includes at least one charge-coupled device.

17. The scan module of claim 15, wherein each of said first and second elongated lamps is at least one of a cold cathode fluorescent lamp and a xenon fluorescent lamp.

18. The scan module of claim 15, wherein each of said first and second elongated lamps has a first spectral content and said at least two light emitting diodes has a second spectral content, said first spectral content being substantially the same as said second spectral content such that an illumination effect created by said at least one additional light source matches that of said elongated lamp.

* * * * *